United States Patent [19]

An

[11] Patent Number: 5,744,886
[45] Date of Patent: Apr. 28, 1998

[54] CAPSTAN MOTOR ASSEMBLY AND ASSEMBLING METHOD THEREOF

[75] Inventor: Hyung-jin An, Suwon, Rep. of Korea

[73] Assignee: Samsung Electronics Co., Ltd., Kyungki-do, Rep. of Korea

[21] Appl. No.: 760,273

[22] Filed: Dec. 4, 1996

[30] Foreign Application Priority Data

Jan. 29, 1996 [KR] Rep. of Korea .................. 96-314

[51] Int. Cl.$^6$ ....................................... H02K 5/00
[52] U.S. Cl. .................. 310/91; 310/67 R; 310/68 B; 310/68 R; 310/90
[58] Field of Search ............................. 310/67 R, 68 R, 310/68 B, 90, 91; 360/98.07, 99.08

Primary Examiner—Steve Stephan
Assistant Examiner—Elvin G. Enad
Attorney, Agent, or Firm—Sughrue, Mion, Zinn, Macpeak & Seas, PLLC

[57] ABSTRACT

A capstan motor assembly and an assembling method thereof are provided. In the capstan motor assembly, a stator coil is mounted directly on a printed circuit board (PCB) substrate, on which a capstan motor shaft and a rotor are assembled. Accordingly, separate assembly of the capstan motor is not required, to thereby enhance productivity. Also, after assembling a body of the capstan motor, the position of the magnetic resistance device is accurately controlled, to thereby produce a capstan motor assembly of good quality.

4 Claims, 3 Drawing Sheets

CAPSTAN MOTOR ASSEMBLY AND ASSEMBLING METHOD THEREOF

BACKGROUND OF THE INVENTION

The present invention relates to a capstan motor assembly in a magnetic recording and reproducing apparatus and, more particularly, to a capstan motor assembly having a capstan motor directly assembled on a main printed circuit board (PCB) and operative to accurately control the position of a magnetic resistance device for controlling the speed of the capstan motor using an adjusting rod, and to a method of assembling the capstan motor assembly.

A deck mechanism for recording and reproducing data on a magnetic tape is applied, for example, to a video cassette tape recorder (VCR), a camcorder and a digital audio tape recorder (R-DAT), and the tape is loaded on a head drum and the loaded tape travels while being pressed between a capstan shaft and a pinch roller.

In general, the capstan motor assembly includes a capstan motor as a driving source, a capstan shaft contacting directly with a tape to travel the tape, and a capstan motor assembly holder for attaching the capstan motor assembly to a deck plate. The capstan shaft rotates in contact with the pinch roller made of rubber, and the tape travels while being pressed between the capstan shaft and the pinch roller.

However, the pinch roller is not supported by the capstan motor assembly but by another supporting means, and the capstan motor assembly is fixed to the deck plate by fixing screws connected to screw holes.

FIG. 1 shows a conventional capstan motor assembly as described above. Referring to FIG. 1, a capstan motor assembly 10 is specially assembled during a manufacturing process and connected to the bottom surface of a deck plate 11 and then fixed by connecting screws 5 to screw holes 2 formed on the deck plate 11.

However, it may occur during the manufacturing process that a thickness of the deck plate 11 and flatness of the capstan motor assembly 10 are often nonuniform and a screw connection portion likewise is not accurate. Accordingly, since a capstan shaft 1 cannot be accurately aligned to be in parallel with a pinch roller (not shown), the tape cannot stably travel during operation of an apparatus. The above-described defects occur due to the screw connection. Besides, a connection portion for connecting the screw should be specially provided, and further connection of the screw is complicated.

In view of the above problems, in a conventional capstan motor assembly, an assembling portion for a capstan motor assembly is formed on a deck plate, and a capstan motor is directly assembled thereon, and a stator coil is attached directly on a metal substrate of a lower portion of the assembling portion, to thereby avoid complication in connection of screws and guarantee smooth travel of a tape.

However, in the conventional capstan motor assembly, use of the metal substrate causes an increase in cost and a magnetic resistance device for accurately controlling the speed of the capstan motor cannot be exactly assembled.

SUMMARY OF THE INVENTION

Accordingly, it is an object of the present invention to provide a capstan motor assembly in which a stator coil is attached on a PCB substrate to form a capstan motor assembly, and at the same time a magnetic resistance device for controlling the speed can be accurately assembled.

It is another object of the present invention to provide a method for assembling a capstan motor assembly.

To accomplish the first object of the present invention, there is provided a capstan motor comprising: a printed circuit board (PCB) substrate on which are mounted a stator coil, a hall device for controlling a rotational position of the capstan motor, and a magnetic resistance device for controlling a speed of the capstan motor and which has a toothed portion at one end; a motor portion including a capstan motor shaft and a rotor assembled so as to rotate with respect to the stator coil and having a magnet; a bracket including a holder having a bore through which the capstan motor shaft passes to be supported; a base deck to which the bracket is connected to be supported; and an adjusting rod having a gear portion meshed with the toothed portion of the magnetic resistance device and rotatably disposed on the PCB substrate in order to adjust a gap between the magnetic resistance-device and the rotor.

To accomplish the second object of the present invention, there is provided a method of assembling a capstan motor, comprising the steps of: mounting a stator coil, a hall device for controlling a rotational position of the capstan motor, and a magnetic resistance device, for controlling a speed of the capstan motor and which has a toothed portion at one end, on a PCB substrate; passing a capstan motor shaft, which is connected to a rotor, through a bore of a holder fixed to a bracket, thereby rotatably mounting the capstan motor shaft in the holder; and connecting the bracket to a base deck, and assembling the PCB substrate in order to position the rotor above the stator coil, wherein after rotating an adjusting rod having a gear meshed with the toothed portion of the magnetic resistance device to adjust a gap between the magnetic resistance device and the rotor, the magnetic resistance device is tightly fixed to the PCB substrate.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE INVENTION

Figure 1:
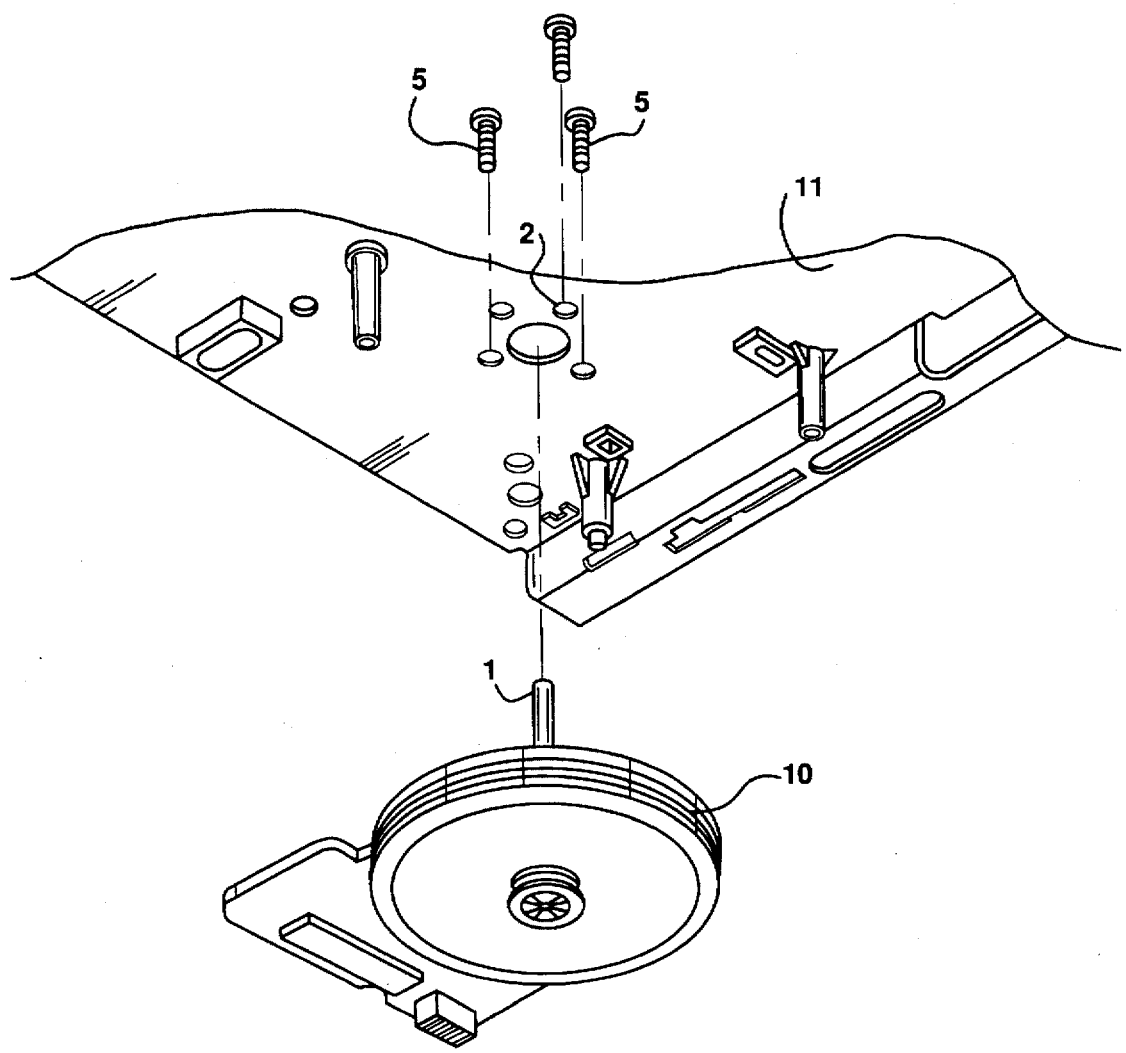
FIG. 1 is a schematic perspective view showing a conventional capstan motor assembly.
Figure 2:
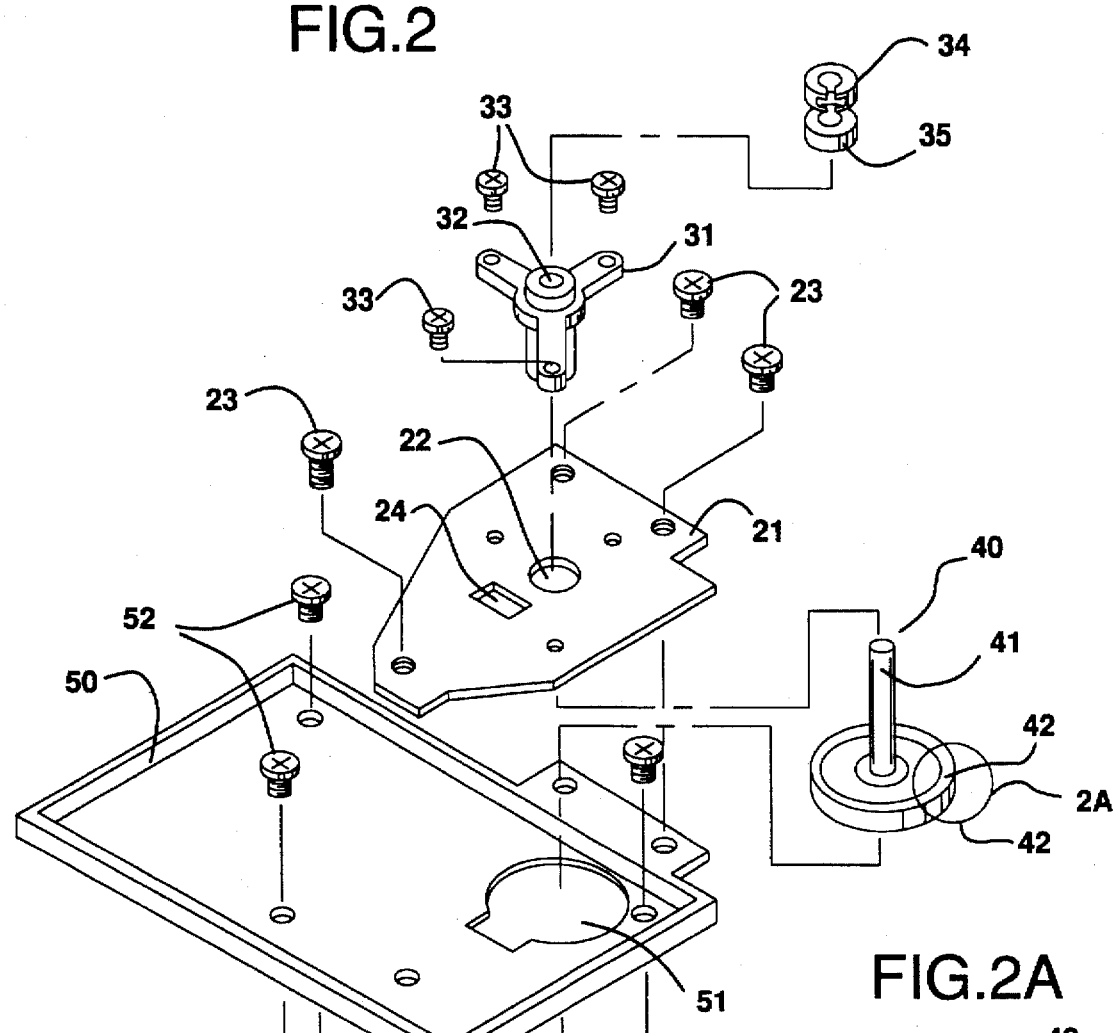
FIG. 2 is an exploded perspective view showing a capstan motor assembly and a partially sectional view of a motor portion thereof according to the present invention.
Figure 2A:
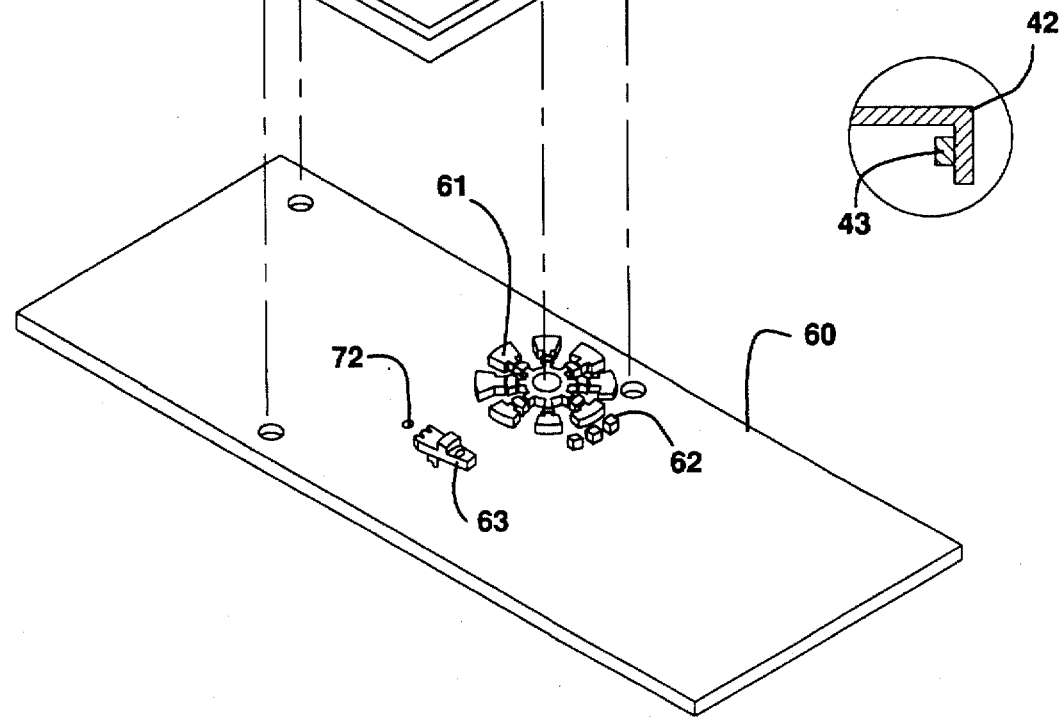
Figure 3:
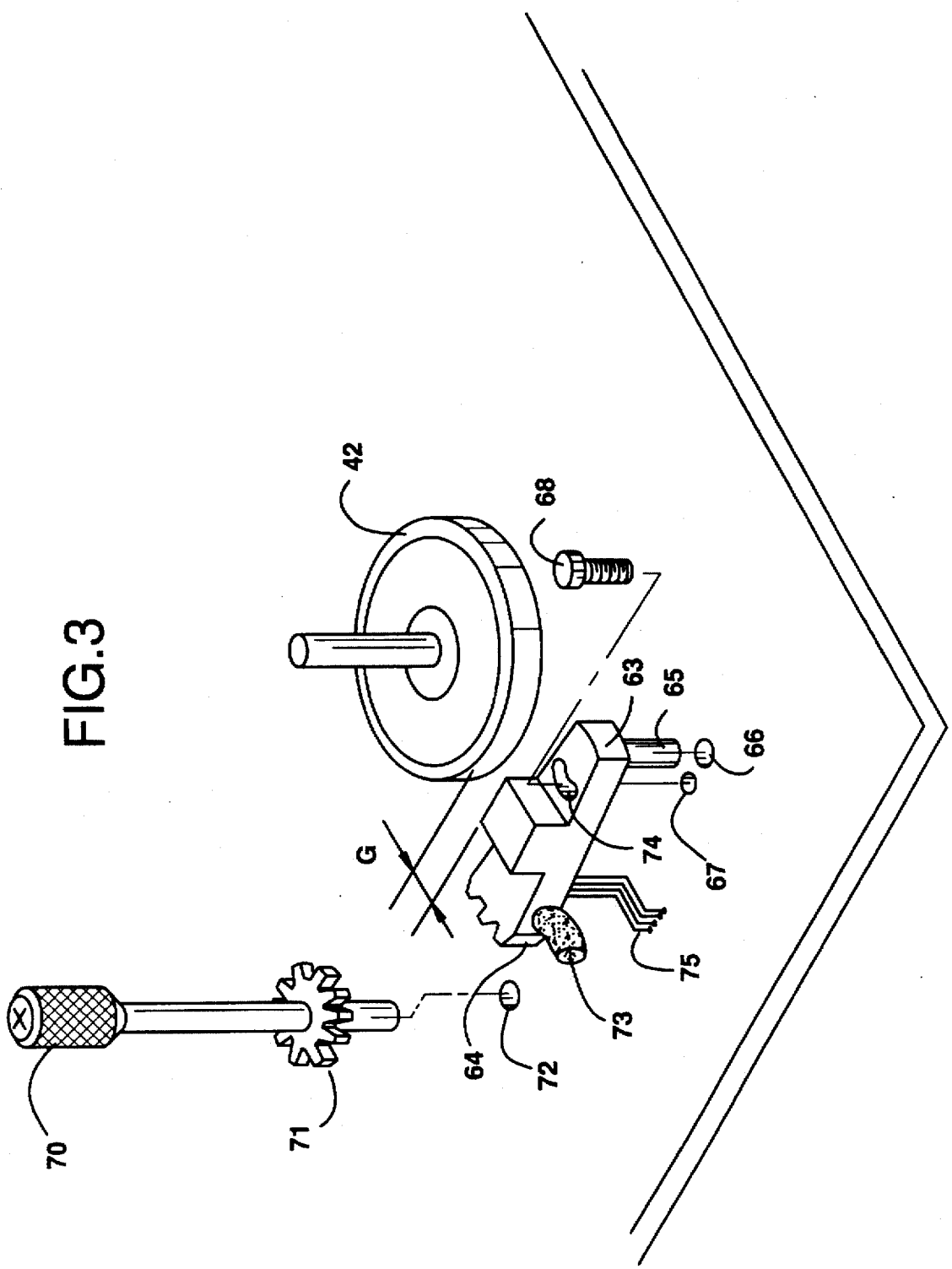
FIG. 3 is a partial perspective view of a capstan motor assembly according to the present invention.

Referring to FIGS. 2 and 3, a capstan motor assembly according to the present invention is provided with a bracket 21 through which a hole 22 is formed, and a holder 31 having a bore 32 is fitted to the hole 22 and connected to the bracket 21 by screws 33. A capstan motor shaft 41 of a motor portion 40 passes through the bore 32 and is rotatably supported therein. A bearing (not shown) can be further provided with respect to the bore 32 of the holder 31 in order to smoothly rotatably support the capstan motor shaft 41. It is desirable that the capstan motor shaft 41 is connected to the holder 31 by an E-ring 34 and a washer 35 in order to support the motor shaft 41 and prevent axial movement thereof. The motor portion 40 can be further provided with a pulley (not shown) for driving a reel.

After the motor portion 40 is assembled, the bracket 21 is connected to a base deck 50 by screws 23.

Meanwhile, a stator coil 61, which is mounted directly on a PCB substrate 60, is provided underneath a rotor 42 of the motor portion 40 to electromagnetically interact with a magnet 43 installed on an edge of the rotor 42. Accordingly, torque is generated according to Fleming's left hand rule, to thereby rotate the capstan motor shaft 41.

Around the stator coil 61, a hall device 62 for controlling a rotational position of the capstan motor is arranged by a predetermined angle.

Meanwhile, on one side of the stator coil 61, a magnetic resistance (MR) device 63 for controlling the speed of the capstan motor is installed. The magnetized magnet 43 is attached to the circumference of the rotor 42 as shown in FIG. 2, and the magnetic resistance device 63 detects magnetic resistance from the magnet 43 to control the speed. Accordingly, as shown in FIG. 3, a gap G between the rotor 42 and the magnetic resistance device 63 should be accurately maintained in order to detect the magnetic resistance and, preferably, is within an extent of approximately 60 to 100 μm.

On the end of one side of the magnetic resistance device 63, a toothed portion 64 is formed and an adjusting rod 70 having a gear portion 71 meshed with the toothed portion 64 is connected rotatably to a combining hole 72 adjacent to the magnetic resistance device 63.

According to the present invention, a method for assembling the magnetic resistance device 63 on the PCB substrate 60 is provided. First, before a body of the capstan motor is assembled, the magnetic resistance device 63 is fixed on the PCB substrate 60 by a temporary fixing means. That is, a protrusion 65 of the magnetic resistance device 63 is pre-soldered to thereby temporarily fix the magnetic resistance device 63 on the PCB substrate 60. Then, the bracket 21 connected with the holder 31, the base deck 50 and the PCB substrate 60 are assembled together by screws 52 to complete the body of the capstan motor.

After assembling of the body of the capstan motor, the gap G between the rotor 42 and the magnetic resistance device 63 is adjusted. That is, the adjusting rod 70 and the gear portion 71 are rotated, to thereby pivot the magnetic resistance device 63 having the toothed portion 64 meshed with the gear portion 71 around the protrusion 65 and accordingly the gap G can be adjusted.

It is desirable that openings 24 and 51 are formed through the bracket 21 and the base deck 50, respectively, in order to operate the adjusting rod 70 manually after assembling the body.

The magnetic resistance device 63 is appropriately positioned, and then a fixing screw 68 is threadedly engaged with a screw hole 67 through a slot 74 formed in the magnetic resistance device 63, to thereby fix tightly the magnetic resistance device 63 on the PCB substrate 60. It is desirable that the slot 74 is long enough to pivot the magnetic resistance device 63 for adjusting the gap G.

It is desirable that a wire 75 of the magnetic resistance device 63 includes a curved portion, as shown in FIG. 3, in order to absorb the position change during adjustment of the gap G.

When the gap G is adjusted, in order to prevent the magnetic resistance device 63 from shaking by vibration, the magnetic resistance device 63 is fixed on the PCB substrate 60 using a resin 73.

In order to separate the adjusting rod 70 after adjusting the gap G, it is desirable that the adjusting rod 70 be attachably and detachably connected.

According to the capstan motor assembly of the present invention, as described above, a stator coil is mounted directly on a PCB substrate, on which a capstan motor shaft and a rotor are assembled. Accordingly, separately assembling a capstan motor is not required, to thereby enhance productivity. Also, after assembling a body of the capstan motor, the position of the magnetic resistance device is accurately adjusted using an adjusting rod, to thereby produce a capstan motor assembly of good quality.

It should be understood that the invention is not limited to the illustrated embodiment and that many changes and modifications can be made within the scope of the invention by a person skilled in the art.

What is claimed is:

1. A capstan motor comprising:

a printed circuit board (PCB) substrate on which are mounted a stator coil, a hall device for controlling a rotational position of the capstan motor, and a magnetic resistance device for controlling a speed of the capstan motor and which has a toothed portion at one end;

a motor portion including a capstan motor shaft and a rotor assembled so as to rotate with respect to said stator coil and having a magnet;

a bracket including a holder having a bore through which said capstan motor shaft passes to be supported;

a base deck to which said bracket is connected to be supported; and an adjusting rod having a gear portion meshed with said toothed portion of said magnetic resistance device and rotatably disposed on said PCB substrate in order to adjust a gap between said magnetic resistance device and said rotor.

2. The capstan motor as claimed in claim 1, wherein said adjusting rod is attachable and detachable.

3. The capstan motor as claimed in claim 2, wherein openings are respectively formed through said bracket and said base deck, which is positioned above said magnetic resistance device, in order to permit manual control of said adjusting rod, after assembling said capstan motor.

4. A method of assembling a capstan motor, comprising the steps of:

mounting a stator coil, a hall device for controlling a rotational position of the capstan motor, and a magnetic resistance device, for controlling a speed of the capstan motor and which has a toothed portion at one end, on a printed circuit board (PCB) substrate;

passing a capstan motor shaft, which is connected to a rotor, through a bore of a holder fixed to a bracket, thereby rotatably mounting the capstan motor shaft in the holder; and connecting the bracket to a base deck, and assembling the PCB substrate in order to position the rotor above the stator coil, wherein after rotating an adjusting rod having a gear meshed with the toothed portion of the magnetic resistance device to adjust a gap between the magnetic resistance device and the rotor, the magnetic resistance device is tightly fixed to the PCB substrate.

* * * * *